(12) United States Patent
Potts et al.

(10) Patent No.: US 10,940,673 B2
(45) Date of Patent: Mar. 9, 2021

(54) METHODS OF FORMING STRUCTURES FOR DOWNHOLE APPLICATIONS

(71) Applicant: Baker Hughes Holdings LLC, Houston, TX (US)

(72) Inventors: Jeffrey R. Potts, Houston, TX (US); Sayantan Roy, Houston, TX (US); Michael H. Johnson, Katy, TX (US); Anil K. Sadana, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 393 days.

(21) Appl. No.: 15/637,652

(22) Filed: Jun. 29, 2017

(65) Prior Publication Data

US 2017/0297306 A1   Oct. 19, 2017

Related U.S. Application Data

(62) Division of application No. 14/510,248, filed on Oct. 9, 2014.

(51) Int. Cl.
| | | |
|---|---|---|
| *B32B 15/08* | (2006.01) | |
| *C08G 61/10* | (2006.01) | |
| *C08G 75/14* | (2006.01) | |
| *C08G 75/20* | (2016.01) | |
| *B32B 9/00* | (2006.01) | |

(Continued)

(52) U.S. Cl.
CPC .............. *B32B 15/08* (2013.01); *B32B 9/005* (2013.01); *B32B 9/045* (2013.01); *B32B 27/285* (2013.01); *B32B 27/286* (2013.01); *C08G 61/10* (2013.01); *C08G 75/14* (2013.01); *C08G 75/20* (2013.01); *C08K 3/32* (2013.01); *C09J 165/00* (2013.01); *B32B 37/1284* (2013.01); *B32B 37/18* (2013.01); *B32B 38/0008* (2013.01); *B32B 2037/1253* (2013.01); *B32B 2307/554* (2013.01); *B32B 2311/00* (2013.01)

(58) Field of Classification Search
CPC ......... B32B 15/08; B32B 9/005; B32B 9/045; B32B 27/285; B32B 27/286; B32B 37/1284; B32B 37/18; B32B 38/0008; B32B 2037/1253; B32B 2307/554; B32B 2311/00; C08G 61/10; C08G 75/14; C08G 75/20; C08K 3/32; C09J 165/00
See application file for complete search history.

(56) References Cited

U.S. PATENT DOCUMENTS 3,397,188 A   8/1968   Smith
5,401,455 A   3/1995   Hatfield et al.
(Continued)

FOREIGN PATENT DOCUMENTS

WO   2009/025518 A2   2/2009

OTHER PUBLICATIONS

BOTM: Jan. 2010, Self Reinforcing Poylphenylene (SRP), 1 page.
(Continued)

*Primary Examiner* — Robert S Walters, Jr.
(74) *Attorney, Agent, or Firm* — TraskBritt (57) ABSTRACT

A method of forming a structure for a downhole application comprises forming an interfacial material comprising at least one of self-reinforced polyphenylene, polyphenylene sulfide, polysulfone, and polyphenylsulfone between opposing surfaces of a first substrate and a second substrate. A downhole structure and a downhole assembly are also described.

16 Claims, 3 Drawing Sheets

(51) Int. Cl.
*B32B 9/04* (2006.01)
*B32B 27/28* (2006.01)
*C08K 3/32* (2006.01)
*C09J 165/00* (2006.01)
*B32B 37/18* (2006.01)
*B32B 37/12* (2006.01)
*B32B 38/00* (2006.01)

(56) References Cited

U.S. PATENT DOCUMENTS

| | | | |
|---|---|---|---|
| 5,547,735 A | | 8/1996 | Roebroeks et al. |
| 6,082,451 A | * | 7/2000 | Giroux .................. E21B 21/10 |
| | | | 166/72 |
| 7,951,213 B1 | | 5/2011 | Miess et al. |
| 2001/0010784 A1 | | 8/2001 | Giebmanns |
| 2004/0237890 A1 | | 12/2004 | Bour |
| 2005/0025900 A1 | | 2/2005 | Cavero |
| 2007/0095473 A1 | * | 5/2007 | Farnsworth ............. B29C 63/34 |
| | | | 156/294 |
| 2008/0191575 A1 | | 8/2008 | Varkey et al. |
| 2010/0314176 A1 | | 12/2010 | Zhang et al. |
| 2011/0073484 A1 | | 3/2011 | Kawagoshi et al. |
| 2011/0226508 A1 | | 9/2011 | Aoi et al. |
| 2012/0025020 A1 | | 2/2012 | Plithides et al. |
| 2013/0131210 A1 | | 5/2013 | Gerrard et al. |
| 2014/0147609 A1 | | 5/2014 | Ren et al. |
| 2014/0158255 A1 | | 6/2014 | Gerrard et al. |

OTHER PUBLICATIONS

Brahmbhatt et al., Novel Self-Reinforcing Polyphenylenes as Implantable Biomaterials, ORS 2011 Annual Meeting, Poster No. 1287, (2011), 1 page.
Solvay Specialty Polymers, PrimoSpire PR-250, 2010.
Kolenak, Roman; Soldering of Ceramic Materials, 2009. (Year: 2009).

* cited by examiner

METHODS OF FORMING STRUCTURES FOR DOWNHOLE APPLICATIONS

CROSS-REFERENCE TO RELATED APPLICATION

This application is a divisional of U.S. patent application Ser. No. 14/510,248, filed Oct. 9, 2014, pending, the disclosure of which is hereby incorporated herein in its entirety by this reference.

FIELD

Embodiments of the disclosure relate generally to methods of forming structures for downhole applications, and to related downhole structures and assemblies. More particularly, embodiments of the disclosure relate to methods of forming downhole structures including at least one substrate adhered to at least one other substrate by way of an interfacial material, and to related downhole structures and assemblies.

BACKGROUND

Wellbores are formed in subterranean formations for various purposes including, for example, extraction of oil and gas from the subterranean formations and extraction of geothermal heat from the subterranean formations. Wellbores can exhibit extremely aggressive environments. For example, wellbores are can exhibit abrasive surfaces, can be filled with corrosive chemicals (e.g., caustic drilling muds, well fluids, such as salt water and crude oil, as well as entrained carbon dioxide, hydrogen sulfide, etc.), and can exhibit increasing high temperatures and fluid pressures (i.e., hydrostatic pressures) at progressively deeper locations. For example, bottom-hole temperatures and pressures at depths of from about 5,000 meters to about 8,000 meters are often greater than 250° C. and 150 megapascals (MPa), respectively.

The extremely aggressive environments of wellbores can rapidly degrade the interfacial materials of structures, tools, and assemblies used in various downhole applications (e.g., drilling applications, conditioning applications, logging applications, measurement applications, monitoring applications, exploring applications, etc.). Such degradation limits operational efficiency, and results in undesirable repair and replacement costs. Accordingly, there is a continuing need for interfacial materials capable of withstanding such extremely aggressive environments and for downhole structures, tools, and assemblies including interfacial materials, as well as for methods of forming such interfacial materials and associated downhole structures, tools, and assemblies.

BRIEF SUMMARY

Embodiments described herein include methods of forming a structure for a downhole application, as well as downhole structures and downhole assemblies. For example, in accordance with one embodiment described herein, a method of forming a structure for a downhole application comprises forming an interfacial material comprising at least one of self-reinforced polyphenylene, polyphenylene sulfide, polysulfone, and polyphenylsulfone between opposing surfaces of a first substrate and a second substrate.

In additional embodiments, a downhole structure comprises a first substrate, a second substrate, and an interfacial material between the first substrate and the second substrate, the interfacial material comprising at least one of self-reinforced polyphenylene, polyphenylene sulfide, polysulfone, and polyphenylsulfone.

In yet additional embodiments, a downhole assembly comprises at least one downhole structure comprising a first substrate, a second substrate, and an interfacial material between the first substrate and the second substrate, the interfacial material comprising at least one of self-reinforced polyphenylene, polyphenylene sulfide, polysulfone, and polyphenylsulfone.

DETAILED DESCRIPTION

Methods of forming structures for use in downhole applications are described, as are downhole structures and downhole assemblies. In some embodiments, a method of forming a structure for a downhole application comprises forming interfacial material comprising at least one of self-reinforced polyphenylene, polyphenylene sulfide, polysulfone, and polyphenylsulfone between a first substrate and a second substrate. The interfacial material and downhole structures, tools, and assemblies including the interfacial material may exhibit enhanced properties (e.g., enhanced mechanical strength, adhesion strength, wear resistance, thermal resistance, chemical resistance, etc.) favorable to the use of the interfacial material and the downhole structures, tools, and assemblies incorporating the interfacial material in downhole applications. The methods, materials, and structures of the disclosure may increase the efficiency of downhole operations and reduce costs as compared to corresponding conventional methods, materials, and structures.

The following description provides specific details, such as material types, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow for manufacturing a structure, tool, or assembly. The structures described below do not form a complete tool or a complete assembly. Only those process acts and structures necessary to understand the embodiments of the disclosure are described in detail below. Additional acts to form the complete tool or the complete assembly from various structures may be performed by conventional fabrication techniques. Also note, any drawings accompanying the present application are for illustrative purposes only, and are thus not drawn to scale. Additionally, elements common between figures may retain the same numerical designation.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "over," "top," "bottom," "underlying," etc., are used for clarity and convenience in understanding the disclosure and accompanying drawings and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

As used herein, the term "configured" refers to a size, shape, material composition, and arrangement of one or more of at least one structure and at least one apparatus facilitating operation of one or more of the structure and the apparatus in a pre-determined way.

Figure 1:
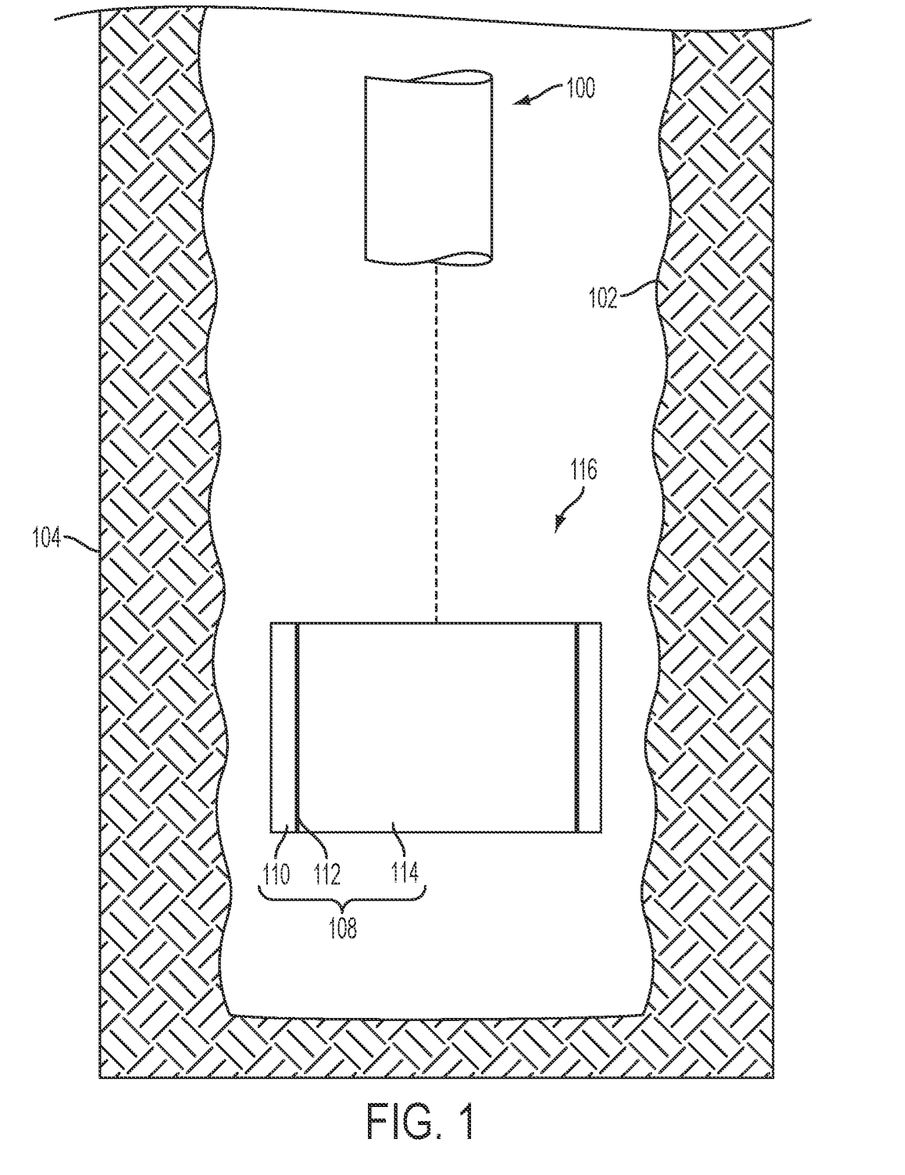
FIG. 1 is a longitudinal schematic view of an assembly for use in a downhole application, in accordance with an embodiment of the disclosure.

FIG. 1 is a longitudinal schematic view of an assembly 100 for use in a downhole application (e.g., a drilling application, a conditioning application, a logging application, a measurement application, a monitoring application, a stimulation application, a remediation application, etc.). As shown in FIG. 1, the assembly 100 may be provided into a wellbore 102 within a subterranean formation 104. The assembly 100 may include at least one downhole structure 108 formed in accordance with methods described hereinbelow. The downhole structure 108 may include a first substrate 110, a second substrate 114, and an interfacial material 112 between the first substrate 110 and the second substrate 114. The interfacial material 112 may adhere (e.g., couple, bond, attach, etc.) the first substrate 110 to the second substrate 114, as described in further detail below. The downhole structure 108 may comprise a downhole tool 116 of the assembly 100. As used herein, the term "downhole tool" and as used herein, means and includes any type of tool, drill bit, joint, sub or other assembly or component of an assembly for use in bore holes or wells in earth formations. The downhole structure 108 may, for example, comprise a tool for use in one or more of a drilling application, a conditioning application, a logging application, a measurement application, a monitoring application, a stimulation application and a remediation application.

Figure 2:
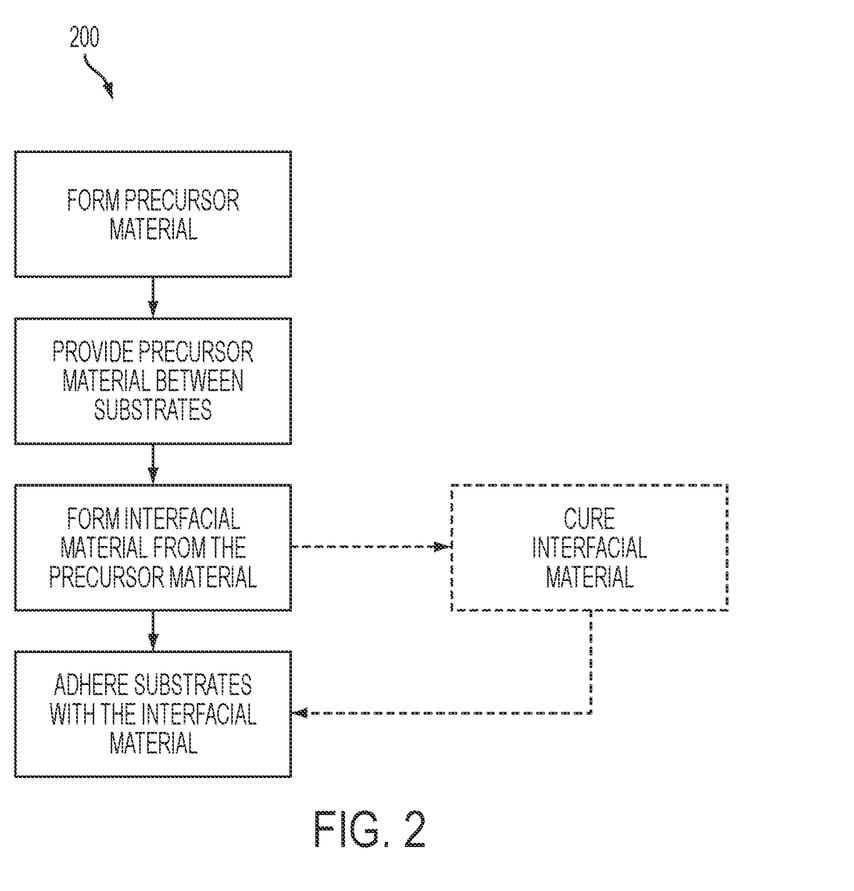
FIG. 2 is a simplified flow diagram illustrating a method of forming a structure for use in a downhole application, in accordance with embodiments of the disclosure.

FIG. 2 is a simplified flow diagram illustrating a method 200 of forming a structure (e.g., such as the downhole structure 108 previously described with reference to FIG. 1) for a downhole application, in accordance embodiments of the disclosure. The method 200 includes forming an precursor material, providing the precursor material between at least two substrates, forming an interfacial material from the precursor material, optionally curing the interfacial material, and adhering the at least two substrates to one another by way of the interfacial material. The method 200 illustrated in FIG. 2 is described in further detail below with in relation to FIG. 3, which is simplified perspective view of a downhole structure formed through the method 200 depicted in FIG. 2. With the description as provided below, it will be readily apparent to one of ordinary skill in the art that the method 200 described herein may be used in various applications. In other words, the method 200 may be used whenever it is desired to form a structure and/or tool for use in a downhole application.

Figure 3:
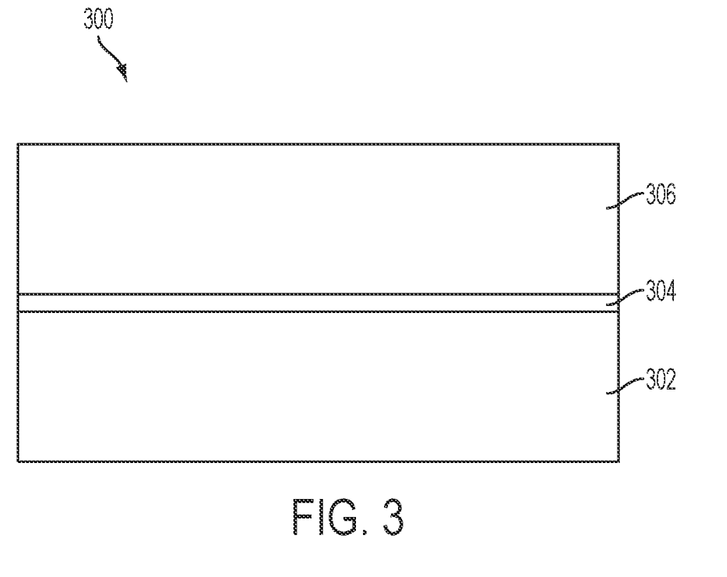
FIG. 3 is a simplified cross-sectional view of a downhole structure, in accordance with embodiments of the disclosure.

Referring to FIG. 3, a downhole structure 300 may include a first substrate 302, an interfacial material 304 on or over the first substrate 302, and a second substrate 306 on or over the interfacial material 304. The first substrate 302 may be indirectly adhered (e.g., bonded, coupled, attached, etc.) to the second substrate 306 by way of the interfacial material 304. For example, as shown in FIG. 3, the interfacial material 304 may be directly adhered to a surface of the first substrate 302 and to an opposing surface of the second substrate 306.

The first substrate 302 and the second substrate 306 may each independently be formed of and include at least one material suitable for use in a downhole environment. By way of non-limiting example, the first substrate 302 and the second substrate 306 may each independently be formed of and include at least one of a wear-resistant material (e.g., an ultra-hard (also characterized as superabrasive) material, such as natural diamond, polycrystalline diamond, thermally stable polycrystalline diamond, cubic boron nitride), a ceramic-metal composite material, a metal (e.g., tungsten, titanium, molybdenum, niobium, vanadium, hafnium, tantalum, chromium, zirconium, iron, nickel, copper, aluminum, silicon, etc.), a metal alloy (e.g., a cobalt-based alloy, an iron-based alloy, a nickel-based alloy, an iron- and nickel-based alloy, a cobalt- and nickel-based alloy, an iron- and cobalt-based alloy, an aluminum-based alloy, a copper-based alloy, a magnesium-based alloy, a titanium-based alloy, a steel, a low-carbon steel, a stainless steel, etc.), and a ceramic (e.g., carbides, nitrides, oxides, and/or borides, such as carbides and borides of at least one of tungsten, titanium, molybdenum, niobium, vanadium, hafnium, tantalum, chromium, zirconium, aluminum, and silicon). In some embodiments, the first substrate 302 and the second substrate 306 each independently comprise at least one of a metal and a metal alloy. In addition, the first substrate 302 and the second substrate 306 may each independently exhibit any desired geometric configuration (e.g., dimensions). The first substrate 302 and the second substrate 306 may exhibit substantially the same material composition and geometric configuration as one another, or the first substrate 302 may exhibit at least one of a different material composition and a different geometric configuration than the second substrate 306.

In some embodiments, the first substrate 302 and the second substrate 306 comprise opposing threaded structures. The threading of each of the first substrate 302 and the second substrate 306 may permit the first substrate 302 and the second substrate 306 to engage in a fastening (e.g., mating) relationship with one another. For example, the first substrate 302 may comprise a threaded male component (e.g., a threaded bolt, a threaded screw, a threaded stud, a threaded bushing, another structure exhibiting external threading, etc.) of the downhole structure 300, and the second substrate 306 may comprise a threaded female component (e.g., a threaded nut, a threaded bushing, another structure exhibiting internal threading, etc.) of the downhole structure 300. The threading of the first substrate 302 may mate with the threading of the second substrate 306, permitting the first substrate 302 to be tightened and/or released through torsional force.

Each of the first substrate 302 and the second substrate 306 may be formed using conventional processes and conventional equipment, which are not described in detail herein.

The interfacial material 304 may be formed of and include at least one polymeric material, and, optionally, at least one additive. The polymeric material comprises at least one amorphous polymer formulated to provide at least one of increased thermal stability, increased chemical resistance, and increased adhesion strength as compared to conventional adhesive (e.g., bonding, joining, coupling, etc.) materials used for downhole applications. For example, the polymeric material may permit the interfacial material 304 to remain substantially adhered to the first substrate 302 and the second substrate 306 during exposure to downhole materials, without any substantial degradation of the interfacial material 304, (e.g., caustic drilling muds, well fluids, such as salt water and crude oil, as well as entrained carbon dioxide, hydrogen sulfide, etc.) to a temperature of at least about 75° C., such as at least about 150° C., at least about 200° C., at least about 250° C., or at least about 275° C. In some embodiments, the polymeric material is formulated to remain substantially adhered to the first substrate 302 and the second substrate 306 during exposure to downhole fluids up to a temperature of about 288° C. The adhesion strength between the interfacial material 304 and each of the first substrate 302 and the second substrate 306 may be measured as a function of the fracture energy sufficient to cause an adhesion failure between the interfacial material 304 and each of the first substrate 302 and the second substrate 306. A high adhesion strength corresponds to a high fracture energy required to cause the adhesion failure, or delamination of the interfacial material 304 from the first substrate 302 and/or the second substrate 306. In embodiments wherein the first substrate 302 and the second substrate 306 comprise opposing threaded structures, the interfacial material 304 may be employed as at least one of a thread seal adhesive and a thread lock adhesive.

By way of non-limiting example, the polymeric material of the interfacial material 304 may comprise at least one of self-reinforced polyphenylene (SRP), polyphenylene sulfide (PPS), polysulfone (PSU), and polyphenylsulfone (PPSU). As used herein, the term "self-reinforced," when used in relation to a polymer, means and includes a polymer having a chemical structure that includes directly-linked ring structures (e.g., benzene rings, phenyl units, etc.) in a polymer backbone structure or within a three-dimensional polymeric network. For example, SRP may comprise a polymer including directly linked, repeating phenyl units as a backbone. The phenyl rings of the repeating phenyl units may independently be substituted or unsubstituted. SRP may, for example, include repeating units of 1,3-phenylene, benzoyl-1,4-phenylene, phenoxy-benzoyl-1,4-phenylene, derivatives thereof, or combinations thereof, wherein 1,3-phenyl ene, benzoyl-1,4-phenylene and phenoxy-benzoyl-1,4-phenylene have the following structures, respectively:

wherein asterisk (*) denotes the point of attachment in the SRP backbone, $R_1$, $R_2$, $R_3$, and $R_4$ are independently hydrogen, a linear or branched C1-C5 alkyl group, a linear or branched C1-C5 alkene group, a linear or branched C1-C5 alkoxy group, a C3-C18 aryl group, or a combination thereof, and each of the foregoing groups can be substituted or unsubstituted. SRP, PPS, PSU, and PPSU are each commercially available from various sources, such as from Solvay Advanced Polymers (Cranbury, N.J.) at least under the the PRIMOSPIRE® (e.g., PRIMOSPIRE® PR-250, PRIMOSPIRE® SRP, etc.) and RADEL® (e.g., RADEL® R-5000, etc.) tradenames. In some embodiments, the polymeric material is SRP. In additional embodiments, the polymeric material is PPS. In further embodiments, the polymeric material includes at least two of SRP, PPS, PSU, and PPSU.

The material composition of the polymeric material may be selected to tailor the interfacial material 304 to particular downhole conditions (e.g., temperatures, pressures, pH, chemical compositions, etc.). For example, the material composition of the polymeric material may be selected (e.g., in conjunction with the material composition of included additives, if any) such that the interfacial material 304 exhibits a glass transition temperature ($T_g$) above an upper temperature limit of a particular downhole application (e.g., drilling application, conditioning application, logging application, measurement application, monitoring application, exploring application, etc.) in which the downhole structure 300 is to be used. Depending at least on the other constituents included therein, an interfacial material 304 formed of and including SRP ($T_g$ 170° C.) and PPSU ($T_g \approx 220°$ C.) may, for example, be employed in downhole applications that may otherwise be too hot for an interfacial material 304 formed of and including SRP alone.

If included, the additive may comprise at least one of a filler material, an extender material, a cross-linking/curing agent, an adhesion promoter, a lubricant, a pigment, a plasticizer, and another polymeric material. Non-limiting examples of suitable additives are described in further detail below.

A thickness of the interfacial material 304 may be selected based on material characteristics of at least one other component of the downhole structure 300 (e.g., material characteristics of one or more of the first substrate 302 and the second substrate 306). By way of non-limiting example, the thickness of the interfacial material 304 may be within a range of from about 100 nanometers (nm) to about 1000 micrometers (μm). In addition, the interfacial material 304 may be substantially homogeneous (e.g., the interfacial material 304 may consist of a single polymer; or the polymeric material and the additive, if any, may be substantially uniformly distributed throughout the dimensions of the interfacial material 304), or may be heterogeneous (e.g., at least one of the polymeric material and the additive, if any, may be non-uniformly distributed throughout the dimensions of the interfacial material 304).

While FIG. 3 depicts discrete boundaries between each of the first substrate 302, the interfacial material 304, and the second substrate 306, in some embodiments the boundaries between the materials may not be discrete. In other words, at least one component of one or more of the first substrate 302, the interfacial material 304, and the second substrate 306 may be partially diffused into another of the first substrate 302, the interfacial material 304, and the second substrate 306 at an interface of the materials. Accordingly, one or more interfaces between the first substrate 302, the interfacial material 304, and the second substrate 306 may include a gradual change (i.e., gradient) in an amount of at least one component, as opposed to a discrete, step-like change.

The interfacial material 304 may be formed from a precursor material including the polymeric material. The precursor material may include the polymeric material, and, optionally, one or more of at least one solvent and at least one additive. In some embodiments, the precursor material comprises a dispersion of the polymeric material, at least one solvent, and, optionally, at least one additive. As used herein, the term "dispersion" means and includes a suspension (e.g., slurry, paste, etc.) of the polymeric material, the solvent, and, optionally, the additive; an emulsion of the polymeric material, the solvent, and, optionally, the additive; a solution of the polymeric material, the solvent, and, optionally, the additive; or combinations thereof. Since a person of ordinary skill in the art will recognize whether a particular reference describes a suspension, an emulsion, a solution, or a combination thereof from the context, for the purposes of readability and claiming the invention, the term "dispersion" refers collectively to a suspension, an emulsion, a solution, or a combination thereof. In additional embodiments, the precursor material is substantially free of solvent. For example, in such embodiments, the precursor material may only include the polymeric material, and, optionally, at least one additive.

The precursor material may be formed of and include a plurality of particles of the polymeric material. Each of the particles may comprise a particle formed of and include a single material (e.g., one of SRP, PPS, PSU, PPSU, etc.), or at least one of the particles may comprise a composite particle. As used herein, the term "composite particle" means a particle including at least two constituent materials that remain distinct on a micrometric level while forming a single particle. The composite particle may, for example, include a core of a first material (e.g., a polymeric material) at least partially encapsulated by a shell of a second material (e.g., a different polymeric material, an organic material, an inorganic material, a metallic material, ceramic material, etc.). By way of non-limiting example, the composite particle may include a primer material (e.g., zinc phosphate, aluminum phosphate, aluminum dihydrogentripolyphosphate, cobalt oxide, etc.) substantially encapsulating a core of a polymeric material (e.g., SRP, PPS, PSU, PPSU, etc.).

A surface of one or more of the particles of the polymeric material may be modified (e.g., functionalized) to facilitate or enhance the interactions between at least one of other particles and a surface of at least one component of the downhole structure 300. For example, the surface of one or more of the particles may be modified with at least one functional group that enhances interactions between at least one of other particles and surfaces of the first substrate 302 and the second substrate 306. The functional groups may be selected based, in part, upon material characteristics of the particles and of at least one structure upon which the interfacial material 304 is to be formed (e.g., the first substrate 302 and the second substrate 306). For example, the functional groups may be selected to facilitate interactions between the particles and the surfaces of the first substrate 302 and the second substrate 306, and to increase adhesion strength between the first substrate 302 and the second substrate 306 upon the formation of the interfacial material 304. The functional groups may be charged functional groups or uncharged functional groups. If the surface of one or more of the particles includes charged functional groups, the particles may have an overall charge, such as a positive charge or a negative charge, or the particles may be neutral if an equal number of positive charge and negative charge functional groups are present. Each of the particles may have substantially the same surface modification, the surface modification of at least one of the particles may be different than the surface modification of at least one other of the particles, or at least one of the particles may have substantially no surface modification. In further embodiments, at least a portion of a surface of at least one of the first substrate 302 and the second substrate 306 may be modified to facilitate or enhance the interactions between the particles and the surface.

Each of the particles of the polymeric material may independently be of a desired size. The particles may comprise, for example, at least one of micro-sized particles and nano-sized particles. As used herein the term "micro-sized" means and includes a size (e.g., width or diameter) of greater than or equal to about one (1) μm, such as from about 1 μm to about 500 μm. As used herein the term "nano-sized" means and includes a size (e.g., width or diameter) of less than 1 μm. In some embodiments, the particles comprise micro-sized particles having an average particle size within a range of from about 100 μm to about 200 μm. In addition, each of the particles may independently be of a desired shape, such as at least one of a spherical shape, a hexahedral shape, an ellipsoidal shape, a cylindrical shape, a conical shape, or an irregular shape. In some embodiments, each of the particles exhibits a substantially spherical shape. The particles may be monodisperse, wherein each of particles has substantially the same material composition (e.g., SRP, PPS, PSU, PPSU, etc.), particle size, and particle shape, or may be polydisperse, wherein the particles include a range of material compositions, particle sizes, and/or particle shapes. Each of the particles may be discrete, or at least two of the particles may be agglomerated into at least one larger structure (e.g., a pellet formed of and including multiple particles). The particles may be formed using conventional methods and equipment, which are not described in detail herein.

If the precursor material includes at least one solvent, the solvent may comprise a liquid in which the polymeric material of the precursor material is at least partially (e.g., substantially) soluble. The solvent may be compatible with the polymeric material, any optional additives, the first substrate 302, and the second substrate 306. As used herein, the term "compatible" means and includes a material that does not undesirably react, break down, or absorb another material, and that also does not undesirably impair the chemical and/or mechanical properties of the another material. By way of non-limiting example, the solvent may comprise at least one of an aqueous solvent and an organic solvent, such as at least one of water, N-methylpyrrolidone (NMP), dimethyl sulfoxide (DMSO), tetrahydrofuran (THF), dimethylformamide (DMF), dimethylacetamide (DMAc), pyridine, an N-substituted pyrrole, a pyrrolidine, a piperidine, a morpholine, chloroform, 1-methoxy-2-propanol acetate (PMA), a glycol, a glycol ether, and an alcohol. In some embodiments, the solvent comprises NMP. In additional embodiments, the solvent comprises a mixture of at least two organic solvents. The solvent may be selected to have a boiling point facilitating evaporation of the solvent, through the application of heat (e.g., by way of a heat source, such as a heat gun, furnace, oven, etc.) or without the application of heat, after applying the precursor material on or over the first substrate 302 and/or the second substrate 306. In some embodiments, the solvent has a boiling point at 760 millimeters mercury (mmHg) of less than or equal to about 250° C., such as within a range of from about 50° C. to about 200° C.

The precursor material may, optionally, include at least one additive. By way of non-limiting example, the additive may comprise at least one of a filler material, an extender material, a cross-linking/curing agent, an adhesion promoter, a lubricant, a pigment, a plasticizer, an anti-oxidant, and another polymeric material. The type and amount of the additive may at least partially depend on the properties of the polymeric material, the solvent (if any), the first substrate 302, and the second substrate 306, as well as on desired properties of the interfacial material 304 to be formed. The additive may be substantially homogeneously distributed relative to the polymeric material (e.g., the particles of the polymeric material and the additive may be substantially uniformly dispersed throughout the precursor material), or the additive may be substantially heterogeneously distributed relative to the polymeric material (e.g., the particles of the polymeric material and the additive may be substantially non-uniformly dispersed throughout the precursor material).

In some embodiments, the at least one additive may comprise at least one filler material. The filler material may be a material formulated and configured to enhance at least one property (e.g., thermal resistance, hardness, tensile strength, tear strength, abrasion resistance, chemical resistance, extrusion resistance, elongation, elastic modulus, bulk modulus, etc.) of the interfacial material 304. Suitable filler materials include, but are not limited to, carbon fillers (e.g., carbon black; graphene; carbon fibers, such as carbon nanofibers, single-walled carbon nanotubes, multi-walled carbon nanotubes; etc.), polytetrafluoroethylene (PTFE) fillers, aromatic polyamide fillers, slagwool fillers (magnesium calcium aluminum silicates), cellulose fillers, ZYLON® fillers, clay fillers, glass fillers, and silica fillers. The filler material may be provided as at least one of a plurality of particles and plurality of fibers. Individual units (e.g., particles, fibers) of the filler material may range from micro-sized (e.g., having a cross-sectional width or diameter greater than or equal to about one micrometer) to nano-sized (e.g., having a cross-sectional width or diameter less than about one micrometer, such as less than or equal to about one micrometer), and may each independently have a desired shape (e.g., a spherical, hexahedral, ellipsoidal, cylindrical, tubular, conical, or irregular shape). The size and shape of the individual units may facilitate different properties in the interfacial material 304. The individual units of the filler material may be monodisperse, wherein each of the individual units has substantially the same material composition, size, and shape, or may be polydisperse, wherein the individual units include a range of material compositions, sizes, and/or shapes.

In additional embodiments, the at least one additive may comprise at least one cross-linking/curing agent. The cross-linking/curing agent may be a material that reduces creep relaxation (and, hence, enhances joint strength) of the interfacial material 304. The cross-linking/curing agent may, for example, enhance at least one of close packing of polymer chains and cross-linking of polymer chains during and/or after the formation of the interfacial material 304. The type and amount of cross-linking/curing agent may at least partially depend on the polymeric material (e.g., SRP, PPS, PSU, PPSU, etc.) and other additives (e.g., filler material) utilized, and on the desired properties of the interfacial material 304 to be formed. A suitable cross-linking/curing agent may, for example, comprise at least one of sulfur, an organic peroxide, diallyl maleate, triallyl cyanurate, triallyl isocyanurate, N,N'-(m-phenylene) bismaleimide, a polyacrylate, a polymethacrylate, a trifunctional acrylate, a trifunctional methacrylate, pentaerythritol tetraacrylate, dipentaerythritol pentaacrylate, trimethylolpropane trimethacrylate, ethylene glycol dimethacrylate, polyethylene glycol dimethacrylate, allyl methacrylate, a liquid butadiene, and methacrylated polybutadiene.

In further embodiments, the at least one additive may comprise at least one other polymeric material. The other polymeric material may be formulated and configured, to enhance at least one property (e.g., thermal resistance, hardness, tensile strength, tear strength, abrasion resistance, chemical resistance, extrusion resistance, elongation, elastic modulus, bulk modulus, etc.) of the interfacial material 304 to be formed. In some embodiments, the other polymeric material may be provided as a plurality of particles (e.g., a powder of particles). The particles may range from micro-sized (e.g., having a cross-sectional width or diameter greater than or equal to about one micrometer) to nano-sized (e.g., having a cross-sectional width or diameter less than about one micrometer, such as less than or equal to about one nanometer), and may each independently have a desired shape (e.g., a spherical, hexahedral, ellipsoidal, cylindrical, conical, or irregular shape). Polymer chains of each of the particles may be substantially non-cross-linked, or polymer chains of at least one of the polymer particles may be cross-linked (e.g., at least one of the polymer particles may exhibit intra-particle cross-linking). The particles may be monodisperse, wherein each of the particles has substantially the same material composition, size, and shape, or may be polydisperse, wherein the particles include a range of material compositions, sizes, and/or shapes. Each of the particles may be discrete, or at least two of the particles may be agglomerated into at least one larger polymeric structure (e.g., a pellet including multiple smaller particles).

The quantity (e.g., amount) of polymeric material and other materials (e.g., solvent, additives), if any, included in the precursor material may be selected at least partially based on the material properties of the polymeric material and the other materials. In embodiments where the precursor material comprises a dispersion, the polymeric material may constitute up to about fifty (50) weight percent (wt %) (e.g., from about 10 wt % to about 20 wt %) of the precursor material, any optional additives may constitute up to about ten (10) wt % (e.g., from about 0.25 wt % to about 10 wt %) of the precursor material, and the solvent may constitute a remaining weight percentage of the precursor material. In additional embodiments, such as where the precursor material is substantially free of solvent, the polymeric material may constitute up to about one hundred (100) wt % (e.g., from about 90 wt % to about 100 wt %) of the precursor material, and any optional additives may constitute up to about 10 wt % (e.g., from about 0.25 wt % to about 10 wt %) of the precursor material. The quantities of polymeric material and any other materials (e.g., solvent, additives) may be selected, in part, to provide the precursor material with a desired viscosity. The desired viscosity may be determined at least partially based on a chosen method of providing (e.g., forming, applying, depositing, coating, etc.) the precursor material on or over one or more surfaces of at least one of the first substrate 302 and the second substrate 306.

The polymeric material (e.g., SRP, PPS, PSU, PPSU, etc.) may be provided on or over one or more surfaces of at least one of the first substrate 302 and the second substrate 306 using at least one conventional deposition process. Suitable deposition processes include, but are not limited to, spin coating, spray coating, brush coating, dip coating, immersion, soaking, and steeping. As a non-limiting example, if the precursor material comprises a dispersion, depending at least on the viscosity thereof, the precursor material may be deposited through at least one of brush-coating and spray-coating. As another non-limiting example, if the precursor material is substantially free of solvent, the precursor material may be heated and deposited (e.g., as a hot melt) through at least one of flame-spray coating and immersion. For example, the precursor material may be heated to a temperature of greater than or equal to about 300° C. (e.g., greater than or equal to about 325° C.) to melt and mobilize at least the polymeric material thereof, and then the precursor material (including the molten polymeric material) may be deposited on or over one or more surfaces of at least one of the first substrate 302 and the second substrate 306. In some embodiments, such heat treatment may transform the polymeric material from a substantially non-amphorous state (e.g., a crystalline state, a semi-crystalline state) into a substantially amphorous state. For example, if the polymeric material is formed of and includes PPS, heating the polymeric material may transform the PPS from a semi-crystalline state into an amphorous state prior to deposition of the PPS on or over one or more surfaces of at least one of the first substrate 302 and the second substrate 306.

The precursor material may be applied on or over surfaces of the first substrate 302 and the second substrate 306 simultaneously, sequentially, or a combination thereof. In some embodiments, the first substrate 302 and the second substrate 306 are positioned relative to one another and then the precursor material is substantially simultaneously applied to opposing surfaces of the first substrate 302 and the second substrate 306. In additional embodiments, the precursor material is applied to a surface of one of the first substrate 302 and the second substrate 306, and then a surface of the other of the first substrate 302 and the second substrate 306 is provided on or over the deposited precursor material. In further embodiments, at least one precursor material (e.g., the same precursor material, or different precursor materials) is separately applied on or over a surface of the first substrate 302 and on or over a surface of the second substrate 306, and then the deposited precursor material on or over the surface of the second substrate 306 is provided onto the deposited precursor material on or over the surface of the first substrate 302.

One or more of the surfaces of the first substrate 302 and the second substrate 306 may, optionally, be treated prior to providing the precursor material thereon or thereover. For example, the surfaces of the first substrate 302 and the second substrate 306 may be subjected to at least one of a cleaning process (e.g., an acid treatment process, such as a nitric acid treatment process) and another pretreatment process (e.g., corona treatment process, a flame treatment process, an adhesion promoter deposition process, etc.). In some embodiments, surfaces of the first substrate 302 and the second substrate 306 are coated with an adhesion promoter (e.g., a primer) prior to forming the precursor material thereover. Non-limiting examples of suitable adhesion promoters include zinc phosphate, aluminum phosphate, aluminum dihydrogentripolyphosphate, and cobalt oxide.

Optionally, before and/or during the application of the precursor material, one or more portions of at least one of the first substrate 302 and the second substrate 306 may be masked to inhibit the precursor material from being provided thereon or thereover. By way of non-limiting example, side surfaces of the first substrate 302 and the second substrate 306 may be masked to inhibit the precursor material from being provided thereon. In additional embodiments, the one or more surfaces of the downhole structure 300 may have polymeric material selectively removed therefrom before the downhole structure 300 is installed in at least one of a downhole tool and a downhole assembly and/or is utilized in a downhole application.

At least in embodiments wherein the precursor material comprises a dispersion, a liquid removal process may be utilized to substantially remove remaining solvent from the deposited precursor material and form the interfacial material 304. In some embodiments, an evaporation process is utilized to remove the remaining solvent. By way of non-limiting example, depending on material properties (e.g., boiling point) of the solvent, the deposited precursor material may be subjected a temperature within range of from about 21° C. to about 250° C. (e.g., from about 100° C. to about 200° C.), for a sufficient period of time to substantially evaporate remaining solvent therefrom and form the interfacial material 304. In additional embodiments, a different liquid removal process (e.g., a spin drying process) may be utilized (e.g., alone, or in conjunction with the evaporation process) to substantially remove remaining solvent of the deposited precursor material and form the interfacial material 304. In embodiments wherein the precursor material is substantially free of solvent, the interfacial material 304 may be formed from the precursor material without the use of a liquid removal process (e.g., by permitting a hot melt of the precursor material to cool and solidify).

Following formation, the interfacial material 304, may, optionally, be subjected to at least one curing process. The curing process may include subjecting the interfacial material 304 to at least one of elevated temperature(s) and elevated pressure(s) (e.g., using a conventional curing apparatus, such as an autoclave, a compression mold, a heat gun, or a lamination press) for a sufficient period of time to enhance one or more properties (e.g., creep resistance, hardness, elastic modulus, bulk modulus, stiffness, toughness, chemical resistance, abrasion resistance, friction coefficient, mechanical strength, and other characteristics) of the interfacial material 304. Curing the interfacial material 304 may enhance at least one of close packing of polymer chains and cross-linking of polymer chains of the interfacial material 304, which may reduce creep relaxation (and, hence, enhance joint strength) of the interfacial material 304. By way of non-limiting example, the interfacial material 304 may be subjected to a temperature less than or equal to about 400° C. (e.g., within a range of from about 250° C. to about 400° C., such as from about 300° C. to about 400° C., or from about 350° C. to about 400° C.) for a period of time within a range of from about 2 hours to about 10 hours to cure the interfacial material 304. In additional embodiments, such as in embodiments where the interfacial material 304 already exhibits desired properties, the curing process may be omitted.

The interfacial materials and associated downhole structures, tools, and assemblies of the disclosure exhibit improved properties as compared to conventional interfacial materials and associated conventional downhole structures, tools, and assemblies. For example, the interfacial materials of the disclosure may exhibit enhanced properties (e.g., enhanced mechanical strength, adhesion strength, wear resistance, thermal resistance, chemical resistance, etc.) relative to conventional interfacial materials, enabling downhole structures, tools, and assemblies including the interfacial materials to withstand the aggressive environmental conditions (e.g., corrosive chemicals, high temperatures, high pressures, etc.) frequently experienced in downhole applications (e.g., drilling applications, conditioning applications, logging applications, measurement applications, monitoring applications, etc.) better that many conventional downhole structures, tools, and assemblies. Accordingly, the interfacial materials and associated downhole structures, tools, and assemblies of the disclosure may exhibit a relatively prolonged operational life, which may reduce costs and increase the efficiency of downhole applications.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. A method of forming a structure for a downhole application, comprising:
   forming a precursor material by mixing at least one solvent and particles of one or more self-reinforced polyphenylene, polyphenylene sulfide, polysulfone, and polyphenylsulfone, at least one of the particles functionalized with charged functional groups,
   providing the precursor material between opposing surfaces of a first substrate and a second substrate, the first substrate and the second substrate each individually comprising one or more of diamond, a ceramic, a metal, a metal alloy, and a ceramic-metal composite material; and
   removing the at least one solvent from the precursor material after providing the precursor material between the opposing surfaces of the first substrate and the second substrate to form an interfacial material between the first substrate and the second substrate, the interfacial material comprising greater than or equal to 90 wt % of a polymeric material including cross-linked polymer chains of the one or more of self-reinforced polyphenylene, the polyphenylene sulfide, the polysulfone, and the polyphenylsulfone.

2. The method of claim 1, wherein the interfacial material comprises at least two of self-reinforced polyphenylene, polyphenylene sulfide, polysulfone, and polyphenylsulfone.

3. The method of claim 1, wherein forming a precursor material comprises selecting the at least one solvent to comprise at least one of water, N-methylpyrrolidone, dimethyl sulfoxide, tetrahydrofuran, dimethylformamide, dimethylacetamide, pyridine, an-N-substituted pyrrole, a pyrrolidine, a piperidine, a morpholine, chloroform, 1-methoxy-2-propanol acetate, a glycol, a glycol ether, and an alcohol.

4. The method of claim 1, wherein the precursor material further comprises at least one of a filler material, a cross-linking agent, and an adhesion promoter.

5. The method of claim 1, wherein providing the precursor material between the opposing surfaces of the first substrate and the second substrate comprises:
   positioning the second substrate over the first substrate; and
   substantially simultaneously applying the precursor material over the opposing surfaces of the first substrate and the second substrate after positioning the second substrate over the first substrate.

6. The method of claim 1, wherein providing the precursor material between the opposing surfaces of the first substrate and the second substrate comprises:
   depositing the precursor material on at least one of the first substrate and the second substrate; and
   adjoining the first substrate and the second substrate together with the deposited precursor material therebetween.

7. The method of claim 1, wherein removing the at least one solvent from the precursor material comprises evaporating the at least one solvent from the precursor material.

8. The method of claim 1, further comprising selecting the first substrate and the second substrate to each individually comprise one or more of a metal and a metal alloy.

9. The method of claim 1, further comprising forming an adhesion promoter on at least one of the opposing surfaces of the first substrate and the second substrate prior to forming the interfacial material between the opposing surfaces of the first substrate and the second substrate.

10. The method of claim 1, further comprising curing the interfacial material at a temperature within a range of from about 250° C. to about 400° C.

11. A method of forming a downhole structure, comprising:
   mixing particles of two or more of self-reinforced polyphenylene, polyphenylene sulfide, polysulfone, and polyphenylsulfone with one or more of an aqueous solvent and an organic solvent to form a precursor material, at least one of the particles functionalized with charged functional groups;
   providing the precursor material between opposing surfaces of a first substrate and a second substrate, the first substrate and the second substrate each individually comprising one or more of diamond, a ceramic material, a metal, an alloy, and a ceramic-metal composite material; and
   solidifying the precursor material.

12. The method of claim 11, wherein forming a precursor material comprises forming the precursor material to comprise self-reinforced polyphenylene and polyphenyl sulfone.

13. The method of claim 11, wherein forming a precursor material comprises forming the precursor material to comprise self-reinforced polyphenylene including repeating units of one or more of 1,3-phenylene, benzoyl-1,4-phenylene, phenoxy-benzoyl-1,4-phenylene, and derivatives thereof.

14. The method of claim 11, wherein forming a precursor material comprises forming the precursor material to further comprise one or more of carbon black, graphene, carbon nanofibers, single-walled carbon nanotubes, multi-walled carbon nanotubes, a polytetrafluoroethene filler, an aromatic polyamide filler, a slagwool filler, a cellulose filler, a poly(p-phenylene-2,6-benzobisoxazole) filler, a clay filler, and silica filler.

15. The method of claim 11, wherein providing the precursor material between the opposing surfaces of a first substrate and a second substrate comprises providing the precursor material between opposing threaded surfaces of the first substrate and a second substrate.

16. A method of forming a downhole structure, comprising: forming a precursor material consisting of:
- particles of at least one polymeric material selected from the group consisting of self-reinforced polyphenylene, polyphenylene sulfide, polysulfone, and polyphenylsulfone, a surface of at least one of the particles functionalized with charged functional groups;
- at least one additive selected from the group consisting of carbon black, graphene, carbon nanofibers, single-walled carbon nanotubes, multi-walled carbon nanotubes, a polytetrafluoroethene filler, an aromatic polyamide filler, a slagwool filler, a cellulose filler, a poly(p-phenylene-2,6-benzobisoxazole) filler, a clay filler, and silica filler; and
- at least one solvent selected from the group consisting of water, N-methylpyrrolidone, dimethyl sulfoxide, tetrahydrofuran, diemethylformamide, dimethylacetamide, pyridine, a N-substituted pyrrole, a pyrrolidine, a piperidine, a morpholine, chloroform, 1-methoxy-2-propanol acetate, a glycol, a glycol ether, and an alcohol;
- providing the precursor material between a first substrate and a second substrate; and
- removing the at least one solvent of the precursor material to form an interfacial material indirectly adhering the first substrate to the second substrate.

\* \* \* \* \*

UNITED STATES PATENT AND TRADEMARK OFFICE
CERTIFICATE OF CORRECTION

PATENT NO. : 10,940,673 B2
APPLICATION NO. : 15/637652
DATED : March 9, 2021
INVENTOR(S) : Jeffrey R. Potts et al.

Page 1 of 1

It is certified that error appears in the above-identified patent and that said Letters Patent is hereby corrected as shown below:

In the Specification
- Column 5, Line 67, change "phenyl ene" to --phenylene--
- Column 6, Line 1, change "phenylene and" to --phenylene, and--
- Column 6, Line 62, change "$T_g$ 170" to --$T_g \approx 170$--

In the Claims
- Claim 1, Column 13, Line 55, change "groups," to --groups;--
- Claim 12, Column 14, Line 67, change "polyphenyl sulfone" to --polyphenylsulfone--

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*